US009302642B2

(12) United States Patent
Faruque et al.

(10) Patent No.: US 9,302,642 B2
(45) Date of Patent: Apr. 5, 2016

(54) VEHICLE ROOF SUPPORT STRUCTURE INCLUDING SIDE CURTAIN AIR BAGS

(71) Applicant: Ford Global Technologies, LLC, Dearbron, MI (US)

(72) Inventors: Mohammed Omar Faruque, Ann Arbor, MI (US); Fubang Wu, Woodhaven, MI (US); Brian Robert Spahn, Plymouth, MI (US); Yijung Chen, Ypsilanti, MI (US); Dean M. Jaradi, Macomb, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/615,824

(22) Filed: Feb. 6, 2015

(65) Prior Publication Data

US 2015/0151703 A1 Jun. 4, 2015

Related U.S. Application Data

(62) Division of application No. 14/045,743, filed on Oct. 3, 2013, now Pat. No. 8,967,662.

(51) Int. Cl.
| | |
|---|---|
| *B60R 21/213* | (2011.01) |
| *B60R 21/232* | (2011.01) |
| *B60R 21/237* | (2006.01) |
| *B60R 21/16* | (2006.01) |

(52) U.S. Cl.
CPC ............ *B60R 21/213* (2013.01); *B60R 21/232* (2013.01); *B60R 21/237* (2013.01); *B60R 2021/161* (2013.01)

(58) Field of Classification Search
CPC ...... B60R 21/21; B60R 21/213; B60R 21/214
USPC ............................................ 280/728.2, 730.2
See application file for complete search history.

(56) References Cited

U.S. PATENT DOCUMENTS

| | | | |
|---|---|---|---|
| 5,791,683 | A | 8/1998 | Shibata et al. |
| 6,142,506 | A | 11/2000 | Patel et al. |
| 6,173,990 | B1 | 1/2001 | Nakajima et al. |
| 6,305,707 | B1 * | 10/2001 | Ishiyama et al. ........... 280/728.2 |
| 6,334,626 | B2 | 1/2002 | Nakajima et al. |
| 6,336,651 | B1 | 1/2002 | Mramor et al. |

(Continued)

FOREIGN PATENT DOCUMENTS

| | | | |
|---|---|---|---|
| JP | 06227340 A | * | 8/1994 |
| WO | 2012117540 A1 | | 9/2012 |

OTHER PUBLICATIONS

Fujinaka et al., Occuapnt Crush Protector for Automobile, Aug. 16, 1994, JPO, JP 06-227340 A, English Abstract.*

(Continued)

*Primary Examiner* — James English
(74) *Attorney, Agent, or Firm* — Jason Rogers; Brooks Kushman P.C.

(57) ABSTRACT

A roof rail assembly for a vehicle that includes a body side outer and an interior trim piece connected to the body side outer. The body side outer and the interior trim piece define a cavity. A roof rail is positioned within the cavity, and a side curtain air bag is positioned below the roof rail. The interior trim piece is assembled about a lower surface of the roof rail in a spaced relationship relative to the curtain air bag to increase visibility around the roof rail assembly.

6 Claims, 4 Drawing Sheets

(56) References Cited

U.S. PATENT DOCUMENTS

| | | |
|---|---|---|
| 6,523,887 B1 | 2/2003 | Picken et al. |
| 6,530,594 B1 | 3/2003 | Nakajima et al. |
| 6,974,151 B2 * | 12/2005 | Ochiai et al. ............... 280/728.2 |
| 7,677,593 B2 * | 3/2010 | Downey ..................... 280/728.2 |
| 8,398,157 B2 | 3/2013 | Marquette |
| 8,651,516 B2 * | 2/2014 | Kim et al. ................. 280/730.2 |
| 8,925,960 B2 * | 1/2015 | Uchida ...................... 280/730.2 |
| 2006/0131849 A1 * | 6/2006 | Ochiai ....................... 280/730.2 |
| 2008/0238053 A1 * | 10/2008 | Downey et al. ............ 280/730.2 |
| 2011/0137443 A1 | 6/2011 | Farahani |
| 2012/0319383 A1 * | 12/2012 | Sugiyama .................. 280/728.2 |
| 2013/0069349 A1 | 3/2013 | Williams et al. |
| 2013/0334799 A1 | 12/2013 | Suga et al. |

OTHER PUBLICATIONS

Fujinaka et al., Occuapnt Crush Protector for Automobile, Aug. 16, 1994, JPO, JP 06-227340 A, Machine Translation of Description.*

* cited by examiner

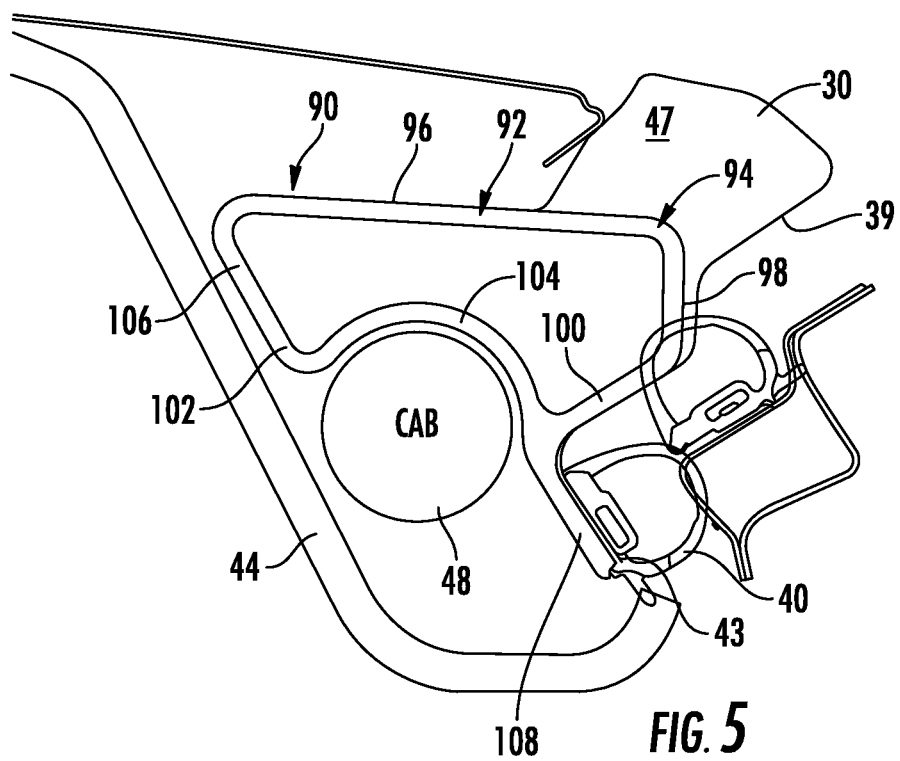

VEHICLE ROOF SUPPORT STRUCTURE INCLUDING SIDE CURTAIN AIR BAGS

CROSS-REFERENCE TO RELATED APPLICATIONS

This application is a divisional of U.S. application Ser. No. 14/045,743 filed Oct. 3, 2013, now U.S. Pat. No. 8,967,662 issued Mar. 3, 2015, the disclosure of which is hereby incorporated in its entirety by reference herein.

TECHNICAL FIELD

The present disclosure relates to vehicle roof support structures with vehicle roof rail assemblies and side curtain air bags.

BACKGROUND

A vehicle roof assembly may consist of a roof panel supported by roof support pillars and a roof rail. The roof support pillars are designated as an A-pillar, B-pillar, C-pillar, and so on. The roof rail extends along a longitudinal axis of the vehicle from the vehicle's A-pillar up to the vehicle's last pillar, such as a C-pillar. On the vehicle exterior, the roof rail is covered by an outer body panel attached to the roof panel. Inside the vehicle, the roof rail is covered by an inner trim panel. Electrical wire bundles and folded side curtain air bags may be positioned in between the roof rail and the inner trim panel. The inner trim panel attached to the roof rail that enclose the electrical wire bundle and folded side curtain air bags is spaced from the outer body panel and reduces occupant vision and interior space. The width of the roof rail and the inner trim panel also reduces the space for ingress and egress of occupants in low profile vehicles, such as coupes and sports cars.

The above problems and other problems are addressed by this disclosure as summarized below.

SUMMARY

An aspect of the present disclosure relates to a roof support structure for a vehicle. The roof support structure includes a roof panel and a pair of A-pillars supporting a front end of the roof panel. Each of the A-pillars is disposed between the windshield and a side door window. The roof support structure further includes a pair of roof rails extending in a longitudinal direction on right and left sides of the roof panel. A side curtain air bag is assembled to each one of the A-pillars and one of the roof rails. The roof rail from A-pillar to C-pillar defines a concave recess extending along the length of the roof rail. The concave recess opens toward a passenger compartment of the vehicle and has a smooth curved surface. The side curtain air bags are folded and assembled into the concave recess with at least half of the outer surface of the curtain air bag contacting the smooth curved surface of the concave recess.

Other aspects of the vehicle roof support structure include a guide surface provided on at least one side of the concave recess. The guide surface is preferably a planar member that extends from the concave recess toward the passenger compartment of the vehicle. The guide surface facilitates smooth deployment of the curtain air bag. The smooth curved surface of the concave recess may be an oval surface and the curtain air bag may be folded into an oval cross-sectional shape.

Another aspect of the present disclosure relates to a vehicle roof rail assembly that supports one side of a roof of a vehicle. The vehicle roof rail assembly includes an elongated tubular roof rail having an outer wall that is convex, an inner wall that defines a concave area, and a rib extending downwardly from and disposed between the outer wall and the inner wall. The vehicle roof rail assembly further includes an outer body panel attached to the outer wall, an active restraint air bag disposed at least partially within the concave area of the inner wall, and an inner trim panel spanning the inner wall and enclosing the folded curtain air bag.

In other aspects of the vehicle roof rail assembly, the outer body panel defines an inner surface that defines a cavity and wherein the outer wall of the roof rail is received within the cavity defined by the inner surface of the outer body panel. At least half of the curtain air bag may be received within the concave area of the inner wall. The inner trim panel may be attached to the rib and extends in an inboard direction to enclose the curtain air bag. The vehicle roof rail assembly may further include a guide surface provided on at least one side of the concave recess. The guide surface is a planar member that extends from the concave area of the inner wall toward a passenger compartment of the vehicle. A door seal may be attached to an outwardly facing surface of the rib adjacent to the juncture of the outer wall and the inner trim panel. The lateral width of the air bag, the rib and the door seal may be less than the width of the roof rail in the transverse vehicle direction. The rib may define a seal recess on an outer seal receiving wall that is separated from the concave area of the inner wall. A door seal is attached to the outer seal receiving wall, and the side curtain air bag and the door seal are disposed above a lower end of the rib.

Another aspect of the present disclosure relates to a vehicle roof rail assembly that includes a body side outer and an interior trim piece connected to the body side outer. The body side outer and inner trim panel define a cavity. A roof rail positioned is within the cavity. A side curtain air bag is positioned below the roof rail. The inner trim panel is assembled about a lower surface of the roof rail in a spaced relationship relative to the side curtain air bag to increase visibility around the A-pillar/roof rail assembly for an occupant in the vehicle.

In other aspects of the vehicle roof rail assembly, the roof rail is in a form of an asymmetrical p-shaped roof rail. The roof rail includes an elongate portion and a loop portion attached to the elongate portion. The loop portion is tucked into the cavity to reduce the distance between the inner trim panel and the body side outer. The body side outer has an inner surface, and the loop portion follows the contours of the inner surface of the body side outer. The elongate portion may be bent to form a concave inner wall. The curtain air bag is positioned at least partially within the concave inner wall of the roof rail. The curtain air bag may have a circular or an oval cross-section.

The above aspects and other aspects of this disclosure are described below in greater detail with reference to the attached drawings.

BRIEF DESCRIPTION OF THE DRAWINGS

FIG. 5 is a cross-section view similar to the view in FIG. 2 showing an alternative embodiment of a roof rail and a side curtain air bag.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
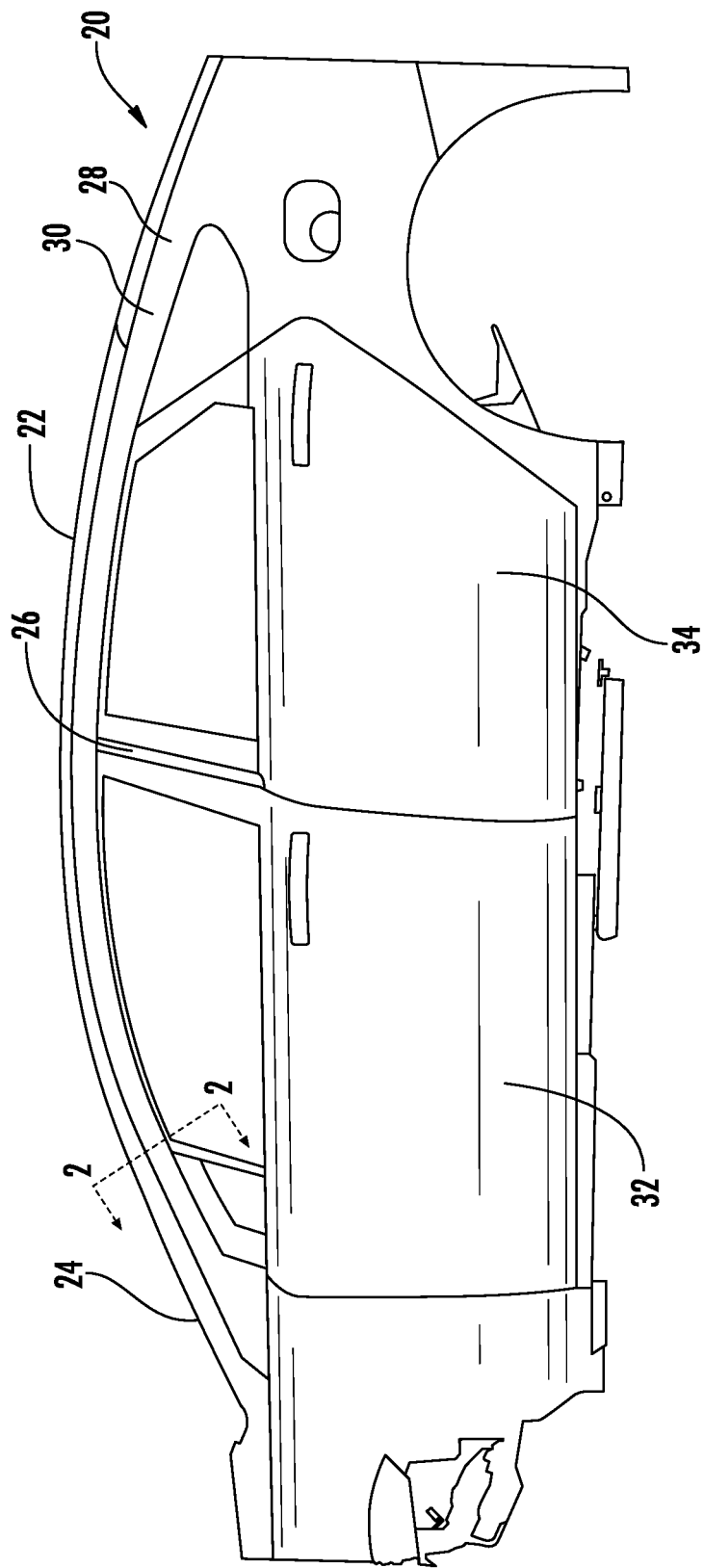
FIG. 1 is a fragmentary side elevation view of a vehicle having an A-pillar and a roof rail structure of the present disclosure.

Referring to FIG. 1, a vehicle 20 incorporating the roof rail assembly of the present disclosure includes a roof panel 22 supported by a pair of A-pillars 24, B-pillars 26, and C-pillars 28. Each of the pair of A-pillars 24 is disposed between a windshield and a side door window. The type of vehicle 20 that is shown is a sedan but the roof rail assembly may be incorporated with any type of vehicle, including those with more or less supporting pillars. The roof panel 22 may be supported by roof bows and a pair of roof rails extending in a longitudinal direction on the right and left sides of the roof panel of the vehicle 20. Each of the roof rails is covered by an outer body panel 30. The roof panel 22 and the outer body panel 30 may be the same panel, or they may be one panel. Certain portions of the outer body panel 30 may form a part of any of the pillars—A, B, or C. The outer body panel 30 is connected to door frames 32 and 34.

Figure 2:
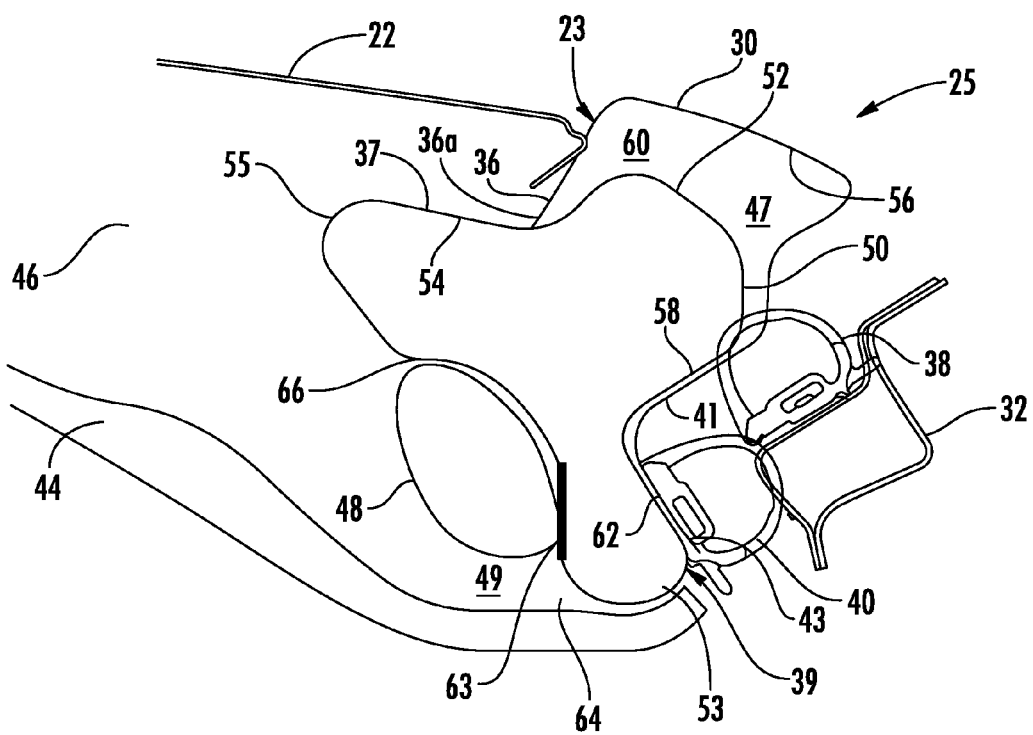
FIG. 2 is a cross-section view taken along line 2-2 in FIG. 1 showing a roof rail and a side curtain air bag of a roof rail assembly embodiment.

Referring to FIG. 2, the roof panel 22, the outer body panel 30, and the door frame 34 form the exterior periphery of a top portion of the vehicle 20. The roof panel 22 and the outer body panel 30 are connected at a roof ditch 23. A roof rail assembly section 25 includes the outer body panel 30, a inner trim panel 44, a roof rail 50, and a side curtain air bag 48. The outer body panel 30 has an inner surface 56 that defines a concave recess extending longitudinally on the vehicle 20, including the applicable pillars of the vehicle 20. The concave recess opens toward a passenger compartment of the vehicle 20 and has a smooth curved surface. The outer body panel 30 includes a first rib 36 adjacent to the roof ditch 23 that downwardly extends in an inboard direction followed by a flange 36a. The flange 36a bends and forms a first planar guide surface 37. The outer body panel 30 further includes a second rib 39 at an end opposite to where the first rib 36 extends. The second rib 39 includes a downwardly extending portion 41. The downwardly extending portion 41 bends and forms a planar surface 43.

A first door seal 38 is attached to the downwardly extending portion 41 of the second rib 39. A second door seal 40 is attached to the outwardly facing planar surface 43 of the second rib 39 that is adjacent to a juncture of the outer body panel and the inner trim panel. Door seals 38 and 40 are positioned in between the door frame 32 and the second rib 39 to prevent elements, such as water and noise, from entering the vehicle 20.

An inner trim panel 44 is attached to the planar surface 43 and extends in an inboard direction. The inner trim panel 44 and the outer body panel 30 define a cavity 46 where a side curtain air bag 48, electrical wires, and a roof rail 50 are positioned. The cavity 46 includes a first pocket 47 defined by an inner surface 54 of the first rib 36, an inner surface 56 of the outer body panel 30, and an inner surface 58 of the downwardly extending portion 41 of the second rib 39. The cavity 46 further includes a second pocket 49 defined by an inner portion 62 of the planar surface 43 and the inner surface 64 of the inner trim panel 44.

The roof rail 50 is preferably an elongated tubular roof rail and includes a first convex outer wall 52 connected to a second convex outer wall 53. The second convex outer wall 53 is connected to a concave inner wall 66, and the concave inner wall 66 is connected to a third convex outer wall 55. The first convex outer wall 52 is disposed within the first pocket 47, and the second convex outer wall 53 is disposed within the second pocket 49. The third convex outer wall 55 is connected to the first convex outer wall 52 at an end that is opposite to the second convex outer wall 53. The third convex outer wall 55 is positioned below the inner surface 54. The concave inner wall 66 is connected to the third convex outer wall 55 on one end and the second convex outer wall 53 on the other end. The concave inner wall 66 opposes the first pocket 47 and faces the inner trim panel 44. The concave inner wall 66 opens toward the passenger compartment of the vehicle. The concave inner wall 66 preferably includes a smooth curved surface and is an oval surface. A second guide surface 63 may be provided on at least one side of the concave inner wall 66. The second guide surface 63 is a planar member that extends from the concave inner wall 66 toward a passenger compartment of the vehicle. The second guide surface 63 enables the side curtain air bag to deploy smoothly.

The side curtain air bag 48 is preferably tucked in the concave inner wall 66. At least half of the outer surface of the side curtain air bag 48 preferably contacts the smooth curved surface of the concave inner wall 66. At least half of the side curtain air bag 48 is also received within the concave inner wall 66. The side curtain air bag 48 may be folded into a cylindrical, circular, or an oval cross-sectional shape. The inner trim panel 44 and the outer body panel 30 enclose the side curtain air bag 48. The curtain air bag 48 extends below the roof rail. The insertion of the first convex outer wall 52 into the first pocket 47, the insertion of the second convex outer wall 53 into the second pocket 49, and the position of the side curtain air bag 48 relative to the concave inner wall 66 minimize the size of the roof rail assembly section 25. The width of the assembly between the outer body panel 30 and the inner trim panel 44 is significantly minimized by placing the side curtain air bag 48 at least partially within the concave inner wall 66. Consequently, the roof rail assembly section 25 improves the occupant vision and the interior space of the vehicle 20. The roof rail assembly section 25 also improves the space for ingress and egress of occupants in low profile vehicles, such as coupes and sports cars.

Figure 3:
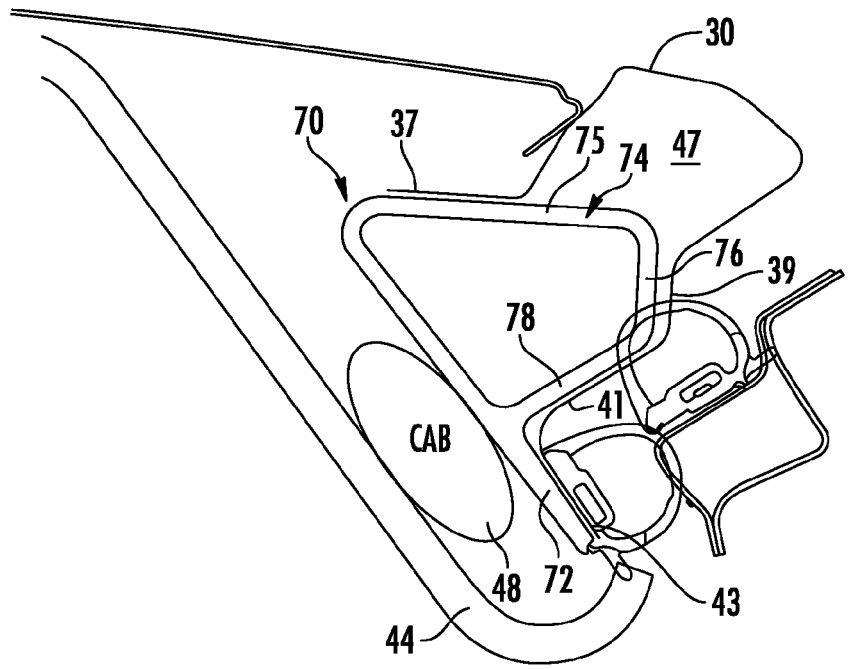
FIG. 3 is a cross-section view similar to the view in FIG. 2 showing an alternative embodiment of a roof rail and a side curtain air bag.

Referring to FIG. 3, another embodiment of a roof rail assembly is shown and includes a roof rail having an elongate portion 72 and a loop portion 74 attached to the elongate portion 72. The loop portion 74 is tucked into the first pocket 47 defined by the outer body panel 30 to reduce the distance between the inner trim panel 44 and the outer body panel 30. The roof rail 70 is an asymmetrical p-shaped roof rail. The asymmetrical p-shaped roof rail includes an elongate portion 72 that is preferably parallel to the planar surface 43. The elongate portion 72 spans from one end of the inner trim panel 44 to an area adjacent to the end of the first planar guide surface 37. The asymmetrical p-shaped roof rail also includes a loop portion 74 that is tucked into the first pocket 47 and follows the contours of the inner surface of the outer body panel 30. The loop portion 74 may include a first side 75 that is parallel to the first planar guide surface 37, a second side 78 that is parallel to the downwardly extending portion 41, and a third side 76 connecting the first side 75 and the second side 78.

Figure 4:
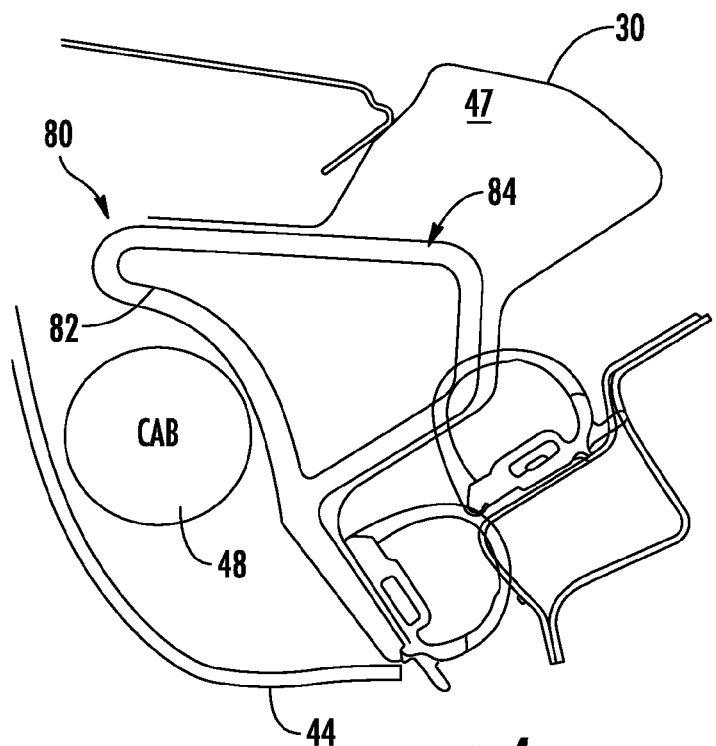
FIG. 4 is a cross-section view similar to the view in FIG. 2 showing an alternative embodiment of a roof rail and a side curtain air bag.

Referring to FIG. 4, yet another embodiment of a roof rail assembly is shown and includes a roof rail 80 that is similar to the asymmetrical p-shaped roof rail 70 of FIG. 3, except that its elongate side 82 is bent to form a concave inner wall. The concave inner wall is for accommodating a curtain air bag 48. The side curtain air bag 48 is received in the concave inner wall. The loop portion 84 of the roof rail 80 is inserted into the first pocket 47. As a result, the distance between the inner trim panel 44 and the outer body panel 30 can be minimized to improve the occupant vision, and increase the ingress and egress clearance.

Referring now to FIG. 5, another embodiment of a roof rail assembly is shown and includes a roof rail 90 having a first loop section 92 that is positioned outside the first pocket 47 and a second loop section 94 that is positioned within the first pocket 47. Roof rail 90 includes a horizontal member 96 that spans from an area adjacent to the inner trim panel 44 to an area within the first pocket 47 adjacent to the second rib 39. Loop members 98 and 100 preferably connect to the horizontal member 96 and follow the contours of the inner surface of the outer body panel 30. An elongate member 102 connects loop member 100 to the horizontal member 96 to close the loop. The elongate member 102 is bent substantially in the middle to form a concave inner surface 104 for accommodating a curtain air bag 48. The elongate member 102 includes a first portion 106 that is substantially parallel to the inner trim panel 44 and a second portion 108 that is substantially parallel to the planar surface 43. The lateral width of the curtain air bag 48, the planar surface 43 of the second rib 39, and the door seal 40 is less than the width of the roof rail 90 in a traverse vehicle direction.

While exemplary embodiments are described above, it is not intended that these embodiments describe all possible forms of the disclosed apparatus and method. Rather, the words used in the specification are words of description rather than limitation, and it is understood that various changes may be made without departing from the spirit and scope of the disclosure as claimed. The features of various implementing embodiments may be combined to form further embodiments of the disclosed concepts.

What is claimed is:

1. A roof support structure for a vehicle comprising:
   a roof panel;
   a pair of A-pillars supporting a front end of the roof panel and each being disposed between a windshield and a side door window;
   a pair of roof rail assemblies extending in a longitudinal direction on right and left sides of the roof panel; and
   a pair of curtain air bags each assembled to one of the A-pillars and one of the roof rail assemblies, wherein one of the A-pillars and one of the roof rail assemblies include an outer body panel having a first rib that downwardly extends in an inboard direction and a second rib at an end opposite to where the first rib extends, the first rib and the second rib having inner surfaces that define a pocket; a roof rail including a first convex outer wall disposed within the pocket, a second convex outer wall connected to the first convex outer wall and a concave inner wall connected to the second convex outer wall, the concave inner wall opposing the pocket and defining a concave recess extending along a length of the A-pillars and the roof rail assemblies, wherein the concave recess opens toward a passenger compartment of the vehicle and has a smooth curved surface, wherein the curtain air bags are folded and assembled into the concave recess with at least half of an outer surface of the curtain air bag contacting the smooth curved surface of the concave recess.

2. The roof support structure of claim 1 further comprising a guide surface provided on at least one side of the concave recess, the guide surface being a planar member that extends from the concave recess toward the passenger compartment of the vehicle.

3. The roof support structure of claim 1 wherein the smooth curved surface of the concave recess is a cylindrical surface and the curtain air bags are folded into a cylindrical cross-sectional shape.

4. The roof support of claim 1 wherein the smooth curved surface of the concave recess is an oval surface and the curtain air bags are folded into an oval cross-sectional shape.

5. A roof support structure for a vehicle having a roof panel comprising:
   an inner trim panel;
   a roof rail assembly extending on a side of the roof panel opposite the inner trim panel, the roof rail assembly including:
   an outer body panel having a first rib that downwardly extends in an inboard direction and a second rib at an end opposite to where the first rib extends, the first rib and the second rib having inner surfaces that define a pocket;
   a roof rail including a first convex outer wall disposed within the pocket, a second convex outer wall connected to the first convex outer wall and an inner wall connected to the second convex outer wall, the inner wall opposing the pocket and facing the inner trim panel, the inner wall further opening toward a passenger compartment of the vehicle and defining a smooth curved surface; and
   a curtain air bag folded and assembled adjacent to the inner wall; wherein the inner wall is a concave inner wall and at least half of an outer surface of the curtain air bag contacts the smooth curved surface of the concave inner wall.

6. The roof support structure of claim 5 further comprising a guide surface provided on at least one side of the inner wall, the guide surface being a planar member that extends from the inner wall toward the passenger compartment of the vehicle.

* * * * *